April 14, 1959  A. BRÖHL ET AL  2,881,684
CAMERA WITH OBJECTIVE COUPLED SHUTTER RELEASE
LOCK AND PICTURE BOUNDARY SELECTOR
Filed March 15, 1955  2 Sheets-Sheet 1

INVENTORS
August Bröhl
Hugo Wehrenfennig
BY Benj. T. Rauber
their attorney

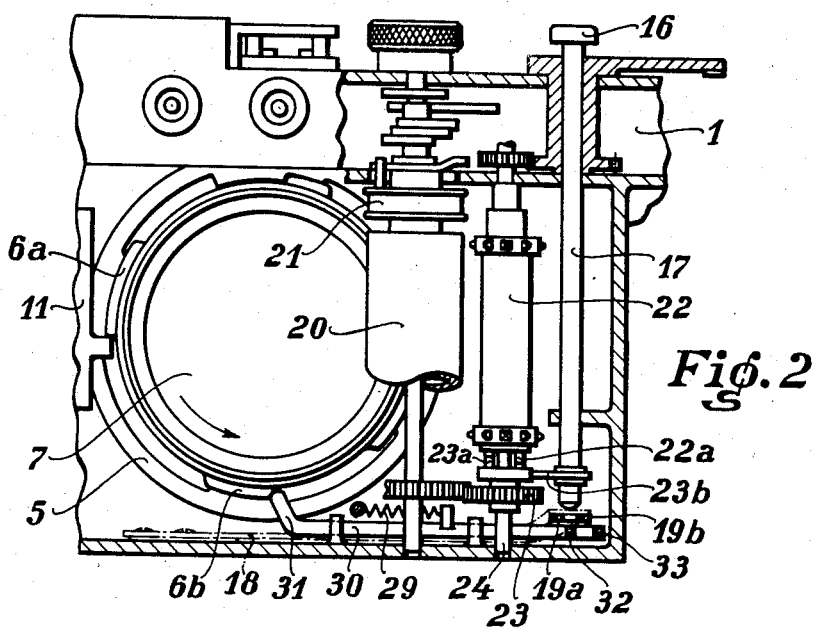
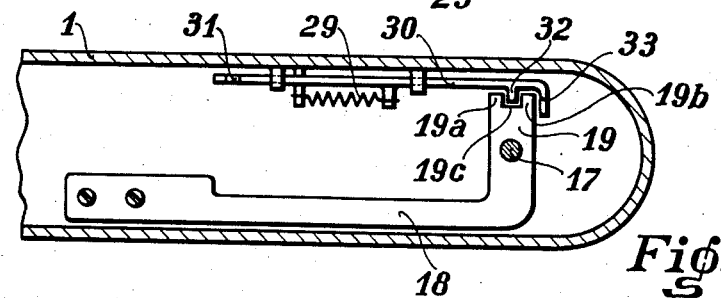
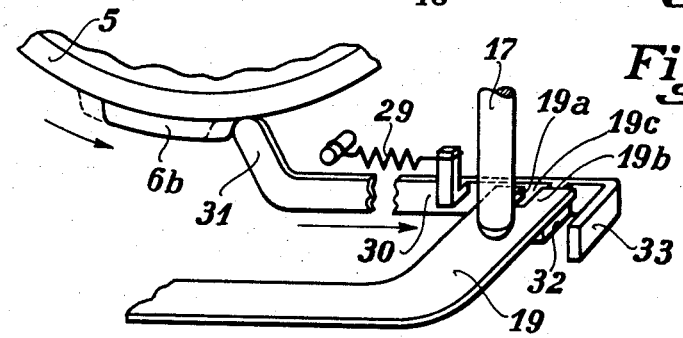

United States Patent Office 2,881,684
Patented Apr. 14, 1959

2,881,684

CAMERA WITH OBJECTIVE COUPLED SHUTTER RELEASE LOCK AND PICTURE BOUNDARY SELECTOR

August Bröhl and Hugo Wehrenfennig, Wetzlar, Lahn, Germany, assignors to Ernst Leitz, G.m.b.H., Wetzlar, Lahn, Germany, a corporation of Germany Application March 15, 1955, Serial No. 494,478

Claims priority, application Germany April 5, 1954

3 Claims. (Cl. 95—11)

Our invention relates to a stop mechanism for the shutter release of a camera having interchangeable objectives and having picture boundary openings, one for each objective, each movable to viewing position when its respective objective is mounted on the camera.

The shifting into viewing position of a picture boundary opening in a camera of the above type depends upon the objective which at the time is mounted on the camera. This is accomplished by a coupling or transmission from the objective to the element in which the picture boundary opening is formed actuated by the objective mounting as it is locked on the camera, each objective mounting having means to move the picture boundary element to bring the proper opening to viewing position. After an objective is mounted on the camera, however, a slight forward or backward turning of the mounting part about its axis after it is mounted may substitute a picture boundary opening not corresponding to the focal length of the objective. In order that an exposure can be had only when the picture boundary opening corresponding to the focal length of the objective mounted is placed in the viewing position, our invention provides a mechanism to stop the shutter release and to permit its release only when the objective mounting is turned to the position to bring to the viewing position the picture boundary opening suited to the focal length of the objective. This stopping mechanism for the shutter release thus brings the shifting means of the picture boundaries into supplemental dependence upon the position of the securing means of the objective on the camera. To make an exposure with an objective of a given focal length but with a picture boundary opening in viewing position not corresponding with this focal length would not provide any control over what part of the object being photographed will appear in the picture. This uncertainty is removed by our invention since the stop mechanism forces the placement of the picture boundary opening corresponding to the focal length of the mounted objective.

In a preferred embodiment of our invention the mechanism comprises a notched plate depressed by the release mechanism and a slide having a finger normally spring held in such position as to obstruct the moving of the plate to release position but movable by a part on the objective mounting to register with the notch and permit the movement of the release plate when the objective is in position to bring its picture boundary opening into viewing position. The objective also has a transmission actuating part to bring its picture opening into view when the stop mechanism has been brought to release position. The objectives preferably have a bayonet coupling with lugs or cams insertable into the housing which upon insertion and rotation actuate the boundary opening member and the slide of the stop mechanism.

Fig. 2 is a rear elevation of a part of the camera with the rear wall removed and partly in section to show the stop mechanism for the shutter release. An exchange objective is mounted and the stop mechanism is in release position relative to the shutter release;

Fig. 3 is a plan view of the arrangement of the stop mechanism on the floor of the camera, and Fig. 4 is a perspective view of the working parts of the stop mechanism in working relation with the actuating arm at the objective mounting.

Figure 1:
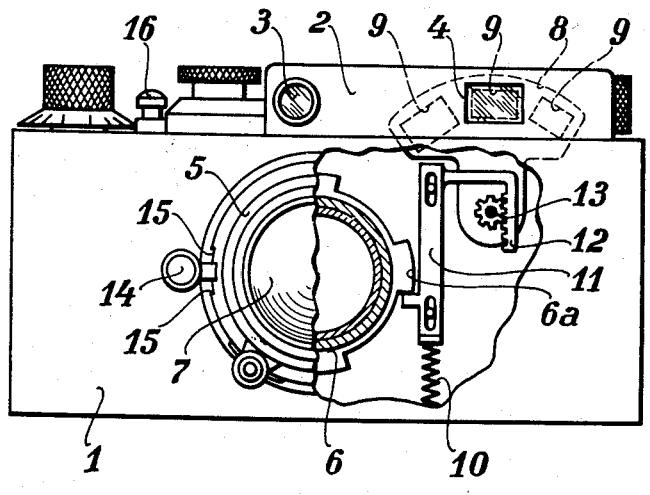
Fig. 1 is a front elevation of the camera, part being broken away to show the shifting means for the picture frame finder.

Referring particularly to Fig. 1, a camera 1 with a rotary slit type shutter is provided in known manner with a range finder 2 with viewing windows 3 and 4. An interchangeable objective 7 mounted on the front wall of the camera 1 by means of a quick change fastening, for example, a bayonet fastening 5, 6, is engageable with the range finder of the camera in a manner known and therefore not illustrated. A carrier 8 for several picture boundary finders 9 is provided for shifting into viewing position the picture areas or boundaries for various objective focal lengths. Through dimensioning bayonet lugs 6a of the bayonet fastening 5, 6, one corresponding to each individual interchangeable objective 7, the carrier 8 can be shifted to bring a corresponding picture boundary 9 into the path of the finding beam through a transmission 11, 12, 13. Movement of the transmission in the reverse direction is driven by a spring 10. The correct coupling position of the objective 7 and of its coupling fastening 5, 6, is insured by means of a spring lock 14. Upon actuating this spring lock the objective is movable equally backward and forward through a path limited by the stops 15 whereby, without regard to the focal length of the objective, the carrier 8 for the picture boundaries is moved and accordingly one or the other of the selector picture boundaries 9 is brought into the path of the finder light beam. In this way the range finder is utilized as a motive finder or focal length selector.

As shown in Fig. 2 a rotary slit shutter of known construction is provided as a shutter for the camera whose starting follows the uncoupling of the curtain drum 20 and the belt roll 21 from the film feed roll 22. For this purpose the drive wheel 23 is slidable on the axis 24 of the film feed roll 22. It has coupling jaws 23a which can come into engagement with coupling jaws 22a of the film feed roll 22. The shifting of the opinion 23 follows upon the shifting of the release rod 17 terminating in the camera release 16, which actuates the shifting of the pinion 23 through an arm 23b. The release rod 17 is supported by the action of an arm 19 of a leaf spring 18 (Fig. 3) which serves as a return spring and with the return of the release also places the coupling combination back between the coupling jaws 22a, 23a, again.

The stop mechanism for the shutter release 16, 17 consists, for example, of a positioning member 30 slidably placed on the inner wall of the camera 1 and acted on by a spring 29. The spring 29 is tensioned to draw a nose 31 at the end of the positioning member 30 in the runway of a bayonet lug 6b (Figs. 3 and 4). The other end of the sliding member 30 is provided with two noses 32 and 33 of different lengths which according to the shifting of the slidable member 30 can be shifted under the leaf spring arm 19. The leaf spring arm has in the position range of the noses 32, 33 of the sliding member 30 two noses 19a, 19b, which form between them a recess 19c. The form and spacing of the noses 32, 33 of the sliding member 30 and the noses 19a, 19b, as also the recess 19c of the leaf spring arm 19, are tuned to each other and to the shifting of the sliding member 30. The nose 32 of the recess is accordingly proportioned to the depth of the recess 19c so that the nose 32 can be pressed into the recess 19c. The nose 33 is on the contrary longer. This form relation has the purpose at various shift positions of the sliding member 30 caused by corresponding shift positions of the bayonet lugs 6b of the objective mounting 5, 6 for the shifting of the picture boundary finder 9 to stop the release of the release rod 17 and to permit the releasing movement of the rod 17 accordingly only in a certain position of the sliding member 30.

The angular space between the lugs 6a and 6b for the different objectives is different so that when the lug 6b is in position to free the shutter release the lug 6a is in the position to bring its picture boundary to viewing position.

The operation of the stop mechanism is as follows:

When no objective is in the mounting the spring 29 shifts the sliding member 30 into the path of rotation of the bayonet lugs 6a of the objective bayonet 5, 6. In this position a nose 33 of the sliding member 30 is positioned under the leaf spring arm 19. The release rod 17 is thereby stopped from shifting so that the release 16 can not be actuated for the purpose of shutter release. If an objective 7 is mounted on the camera the bayonet lug 6b comes into working engagement with the nose 31 of the sliding member 30 and shifts it against the action of the spring 29. The relation is so selected that in the correct coupling position between the objective mounting and the range finder of the distance selector one nose 33 of the sliding member 30 is moved out of the range of the leaf spring arm 19 while the other nose 32 is in the range of the recess 19c of the leaf spring arm 19. In this position by pressing in the release 16 the release rod 17 can be shifted axially and thereby by depressing the coupling, the jaws 22a, 23a, will be brought out of engagement to release the shutter. If, on the contrary, the objective mounting—in the rest position of the release 16, 17—is turned out of this position, then the nose 32 of the sliding member 30 moves out of the range of the recess 19c and under the nose 19b of the leaf spring arm 19, whereby the shutter release is again stopped. If the objective mounting is turned back a certain amount from the correct coupling position, then the nose 32 moves under the nose 19a of the leaf spring arm 19 and there again stops the release movement. If the objective mounting is still further turned reversely to remove the objective from the camera, the nose 32 then passes out of the range of the leaf spring arm 19 and the longer nose 33 of the sliding member 30 moves again under the leaf spring arm 19 and thereby stops the release movement.

Having described our invention, what we claim is:

1. A photographic camera comprising a housing having an opening to receive interchangeable objectives to rotate therein to locked position, a shutter release in said housing, a picture boundary selector in said housing having picture boundary openings, one for each objective, movable to bring said openings severally to viewing position, a spring pressing said selector in a backward direction, said selector having a projection extending into the path of rotation of a part of an objective in said opening to be engaged by said objective and moved against the action of said spring to bring that picture boundary opening corresponding to the focus of said objective to viewing position upon rotation of said objective to said locked position and to move one of the other picture boundary openings not corresponding to the focus of said objective inserted in said opening to viewing position upon a turning of said objective to a position beyond or short of its locked position, a shutter release stop, a second spring pressing said stop to position to stop said shutter release, said stop extending into the path of rotation of a part of said objective inserted in said opening to be engaged and moved by said objective against the action of said second spring to position to free said shutter release upon rotation of a mounted objective to locked position and moved to stop said shutter release by movement of said objective beyond or short of locked position or by said spring upon slight backward turning of said objective out of its locked position.

2. The photographic camera of claim 1 in which said shutter release stop comprises a spring member in the path of movement of the shutter release to be depressed by actuation of the shutter release and having a notch and a positioning member pressed by said second spring to project into the path of rotation of a part of an objective inserted into said opening, said member having a nose positioned to align with said notch when an inserted objective is moved to locked position thereby to permit said spring member to be depressed and said shutter release to be operated and to be moved by said second spring to bring said nose out of alignment with said notch to obstruct the depression of said spring member and actuation of said shutter release when the objective is not in locked position.

3. The photographic camera of claim 2 in which said positioning member is a slidable rod movable by said second spring to bring one end in the path of said objective part.

References Cited in the file of this patent

UNITED STATES PATENTS

| | | |
|---|---|---|
| 1,893,327 | Howell | Jan. 3, 1933 |
| 2,122,671 | Leitz et al. | July 5, 1938 |
| 2,187,246 | Nerwin | Jan. 16, 1940 |
| 2,620,712 | Clifford | Dec. 9, 1952 |
| 2,655,084 | Roehrig | Oct. 13, 1953 |

FOREIGN PATENTS

| | | |
|---|---|---|
| 1,064,773 | France | Dec. 30, 1953 |